Nov. 26, 1929.  J. W. WELSH  1,736,955
MACHINE FOR MAKING SPECTACLE TEMPLES
Filed Jan. 4, 1926    2 Sheets-Sheet 1

Inventor
James W. Welsh
By David Rines
Attorney

Nov. 26, 1929.　　　　J. W. WELSH　　　　1,736,955
MACHINE FOR MAKING SPECTACLE TEMPLES
Filed Jan. 4, 1926　　　2 Sheets-Sheet 2
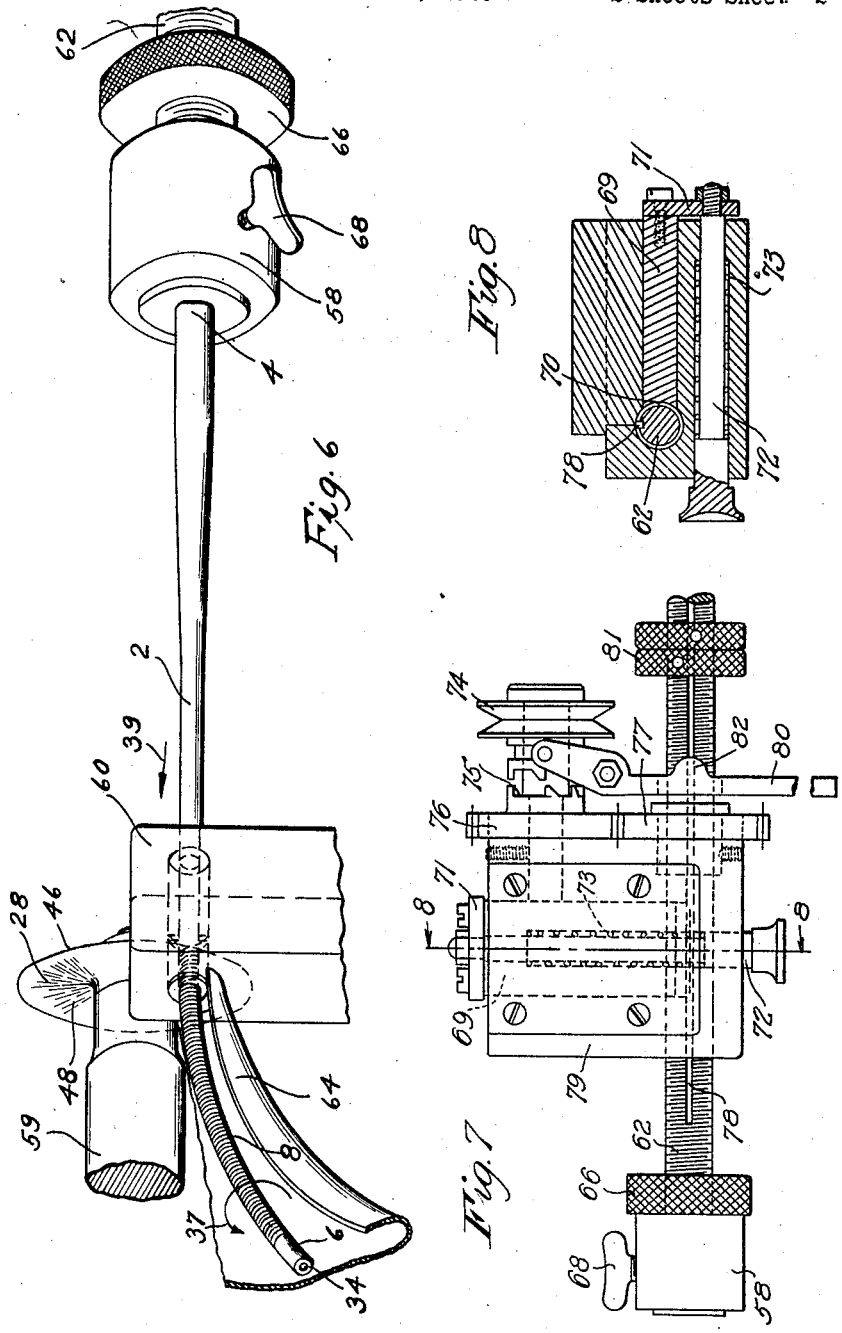
Inventor
James W. Welsh
By David Rines
Attorney Patented Nov. 26, 1929

1,736,955

UNITED STATES PATENT OFFICE

JAMES WILSON WELSH, OF PROVIDENCE, RHODE ISLAND, ASSIGNOR TO BAUSCH & LOMB OPTICAL COMPANY, OF ROCHESTER, NEW YORK, A CORPORATION OF NEW YORK

MACHINE FOR MAKING SPECTACLE TEMPLES

Application filed January 4, 1926. Serial No. 79,140.

The present invention relates to machines for making articles like spectacle temples of the so-called "cable" type comprising non-metal material. The present application is a continuation in part of application Serial No. 727,963, filed July 24, 1924.

Cable temples usually comprise one or more strands, wound in more or less helical form about a core, to render the temple flexible. In the case of metal temples, the strands are very thin, and they may therefore be wound very close together. In the case of the much larger and heavier non-metal temples, the helical coils have been much thicker, and they could not be wound so compactly. At the rear portions of such temples, bent into ear-hook or other temple shapes, the strands visibly separate on the convex sides of the curves of the temples, providing dirt- and other débris-collecting spots, besides rendering the temple unsightly.

One object of the present invention is to provide improved apparatus for making temples of the above-described character, to the end that a better, more efficient and less expensive article may be produced.

Other objects will be made clear in the course of the subjoined description, taken in connection with the accompanying drawings, and the scope of the invention will be particularly set forth in the appended claims.

Figure 1:
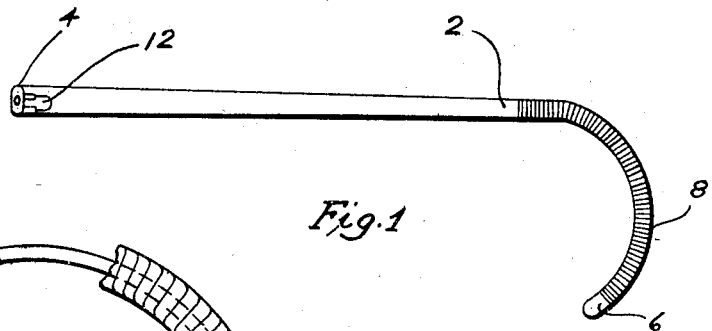
Figure 2:
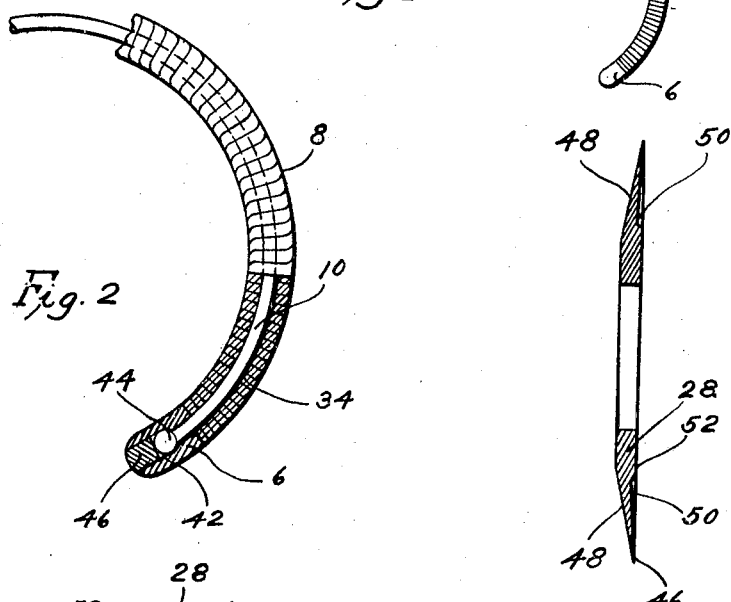
Figure 3:
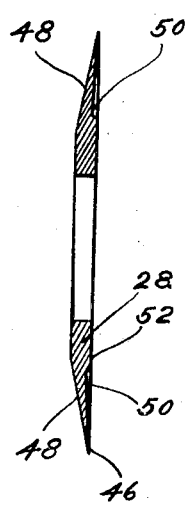
Figure 4:
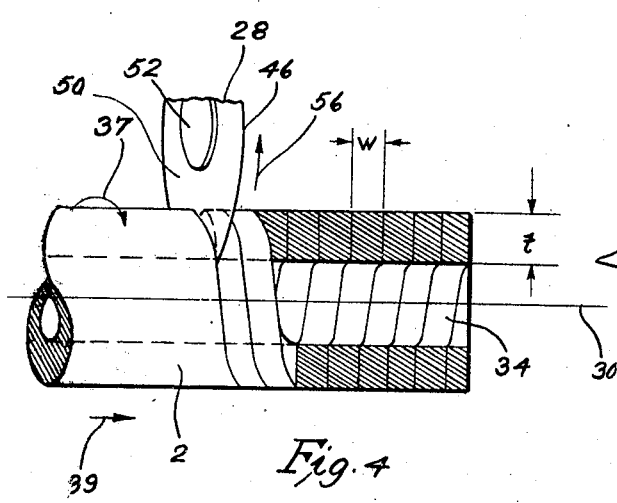
Figure 5:
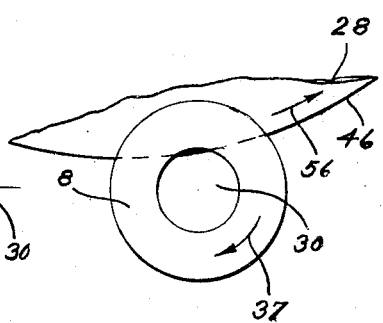

In the accompanying drawings, Fig. 1 is an elevation of a cable temple constructed according to a preferred embodiment of the present invention; Fig. 2 is a fragmentary enlarged elevation, partly in longitudinal section, of the tip of the preferred temple; Fig. 3 is a transverse section of a preferred cutter, upon a further enlarged scale; Figs. 4 and 5 are respectively a side and an end view upon a similar enlarged scale, further illustrating the preferred method of manufacture; Fig. 6 is a side view of preferred apparatus; Fig. 7 is a plan of mechanism for actuating the shaft shown in Fig. 6; and Fig. 8 is a section taken upon the line 8—8 of Fig. 7, looking in the direction of the arrows.

In the manufacture of cable temples comprising non-metal material, it is advantageous to start a cylindrical tube of non-metal material, like zylonite, celluloid and the like, and to cut away the material on the outside of a portion of the tube to reduce the thickness of the said portion. It is preferred, as shown, to have the finally shaped tube, indicated by the numeral 2, taper from the larger end 4 towards the end 6 of smaller diameter. To increase its flexibility, the portion of smaller diameter of the tube 2 is cut into the form of a helix, as shown at 8, which renders it very yielding. As non-metal material of the above-described character is resilient, the non-metal material thus cut is maintained in its helical form by its own resiliency. A metal reinforcing rod or core 10 is now inserted in the bore of the tube, and is fixed therein in any well-known manner. The rod 10 may be of the same material of which flexible metal temples are made, or of any other suitable material. The helical portion 8 of the tube 2 will thus become stiffened, but it will have the same degree of flexibility as the metal rod 10. The tapered, helically cut portion of the tube 2, with the metal rod 10 inserted therein, is preferably then bent into a hook or temple shape, as shown in Figs. 1 and 2, though it is within the scope of the invention to assemble the parts after bending. The customary hinge plate 12 is added at the forward end 4 of the tube, completing the temple. If desired, the uncut and the cut portions of the tube may be made in separate parts, suitably secured together, and both mounted upon a common reinforcing rod. Unsightly dirt-collecting cracks have a tendency to appear at the convex sides of the curves of temples so produced.

The dirt-collecting cracks are eliminated, according to the present invention, by making the helical coils comparatively thin, and then pulling the successive coils snugly together. The rear end or tip 6 of the helically cut tube 8 is left intact, except that it is provided with a recess 42 of larger diameter than the bore 34 of the tube. The rod 10 is provided with an enlarged terminal ball head 44 that is seated in the recess. A plug 46 is mounted in the recess 42 to conceal the ball head 44.

According to the preferred embodiment of the present invention, the helical cutting may be effected by means of a rotary cutter 28 the plane of which is everywhere inclined to the axis 30 of the tube 2. The cutter 28 is caused to extend into the bore 34 of the tube 2, but preferably not so far as to intersect the axis 30. The cutter is of large width compared to the diameter of the tube, so that it may extend beyond the sides of the tube. The end 4 of the tube 2 is held in a rotary clutch 58 and the end 6 is positioned in a work guide or bushing 60, near the cutter 28. The clutch 58 is positioned at the end of a rotary screw-threaded shaft 62 the threads 70 provided at one of the edges of which mesh with the threads of a slidably-mounted split nut block 69. Rotation of the shaft, therefore, will cause the clutch to rotate and simultaneously advance towards the guide or bushing 60. The tube 2 is thus fed relatively to the cutter 28, with a combined rotary and longitudinal movement, as indicated by the arrows 37 and 39, and the resulting slot cut is caused to assume the form of a helix.

A quick return of the shaft 62 in an axial direction, as hereinafter explained, may be effected by opening the split-nut block 69. To this end, the block 69 is connected, by means of plate 71, to the slidably mounted rod 72. A coil spring 73 surrounds rod 72 and normally tends to keep the split-nut block 69 in co-operative relation with the threaded shaft 62. By pushing on the rod 72, against the tension coil spring 73, the split-nut block 69 is moved out of contact with shaft 62 and thereby permits the shaft 62 to be freely moved back and forth in an axial direction.

Power is supplied to grooved pulley 74 by means of a belt attached to any suitable source. By means of clutch 75, power is transmitted to the gear wheel 76 which in turn meshes with a gear wheel 77. The threaded shaft 62 passes through the hub of gear wheel 77 and a key (not shown) on gear wheel 77 cooperates with a groove 78 in shaft 62 so that power supplied to the pulley 74 will be transmitted to drive shaft 62.

In order that the coils of the helix may be relatively thin, it is necessary to have them relatively close together, with the cuts between them as narrow as possible. The cutting edge 46 of the cutter 28 is therefore made razor shaped, with its faces 48 and 50 both slanting to one side of a plane 52 at right angles to the axis of the cutter, as shown more particularly in Fig. 3. The cutter is thus thinned down to a very sharp edge. The face 48 may be referred to as the convex side of the cutter, and the face 50 as the concave side. The cutter is so positioned relatively to the tube 2 during the cutting operation that its sloping faces 48 and 50 shall both be inclined to the axis 30 of the tube 2, with the concave side of the cutter facing towards the arrow 39, Fig. 6. The most suitable position of the cutter 28 must usually be found by experiment. If the cutter is suitably positioned, it will rotate in a direction opposite to the direction of rotation of the tube, as indicated by the arrow 56 in Figs. 4 and 5. This rotation of the cutter is effected by friction against the non-metal material of the tube. Good results are, however, obtainable when the cutter is maintained against rotation. To permit rotation of the cutter, the cutter is mounted to rotate upon a shaft 59. The shaft is rotated by a pulley (not shown). Provision is made for adjusting the shaft in all directions, to permit of holding the cutter at the most suitable angle for effecting the cutting.

In operation, the split-nut block 69 is moved away from shaft 62 by pushing on rod 72, thereby allowing the shaft 62 to be freely moved to the right in Fig. 7 until the adjustably mounted stop collar 66 contacts with plate 79. The return movement of the shaft 62 is thus limited by the stop collar 66. One end of a tube 2 is then secured in the clutch 58 by a clamp screw 68, and the other end is mounted on the bushing or guide 60. The bushing 60 is clamped in position. By moving the pivoted lever 80 to the right (in Fig. 7), the shaft 62 will be rotated and will simultaneously be moved longitudinally since the shaft is in threaded engagement with split nut 69. This will cause the clutch to advance towards the cutter 28, in the direction of the arrow 39, Fig. 6, and at the same time rotate, with the result that the cutter will produce a helical cut in the tube 2. The helically cut portion of the tube is advanced into a guide 64.

When the adjustably mounted collar 81 contacts with the projection 82 on lever 80, the clutch 75 is automatically disengaged, thereby stopping further movement of the shaft 62. The helically cut tube 2 is then removed from clutch 58 by loosening the clamp screw 68, the split-nut block 69 is moved out of engagement with shaft 62 by means of rod 72, so that the shaft and clutch 58 may be moved freely to the right, and the operation described is then repeated. The ratio between the rate of rotation of the tube 2 and the rate of its advance is such that a very fine helical coil is produced, the width $w$, Fig. 4, of each coil being less than the thickness $t$ of the wall of the tube. It is found advantageous to have the value of $w$ about half that of $t$. The forward movement of the clutch 58 is limited in any desired way.

It will be understood that the invention is not restricted to the exact embodiment thereof that is illustrated and described herein, but that modifications will readily occur to persons skilled in the art, and all such are considered to fall within the spirit and scope of the invention, as defined in the appended claims.

What is claimed is:

1. A machine of the class described having, in combination, a support, means for supporting a tube, a freely rotatable cutter mounted upon the support, one face of which is convex and the other face concave, the cutter being everywhere inclined to the axis of the tube so that the cutter extends into the bore of the tube without intersecting the said axis, and means for moving the tube relatively to the cutter longitudinally of the said axis in a direction towards the concave face of the cutter and rotatably about the said axis, the cutter being adapted to be rotated by frictional engagement with the tube to produce a helical cut in the tube.

2. A machine of the class described having, in combination, a support, a cutter mounted upon the support, a chuck for holding a tube with the cutter extending into the bore of the tube, and means for rotating the chuck and at the same time moving the chuck toward the cutter to produce a helical cut in the tube.

3. A machine of the class described having, in combination, a support, a cutter mounted upon the support, a chuck, a guide, the chuck and the guide being adapted to support an article to be cut by the cutter, and means for rotating the chuck and at the same time moving the chuck toward the cutter, whereby the article is rotated and at the same time advanced through the guide past the cutter, the cutter being everywhere inclined to the direction of advance of the article.

4. A machine of the class described having, in combination, a support, a cutter mounted upon the support, a chuck, a guide, the chuck and the guide being adapted to support an article to be cut by the cutter, and means for rotating the chuck and at the same time moving the chuck toward the cutter while the cutter is cutting the article, whereby the article is rotated and at the same time advanced through the guide past the cutter during the cutting action of the cutter upon the article.

5. A machine of the class described having, in combination, means for supporting a tube, a cutter having a large width compared to the diameter of the tube, the cutter being thinned down to a very sharp edge, means for supporting the cutter with the cutter extending into the bore of the tube and beyond the sides of the tube, and means for relatively moving the tube and the cutter with a combined relative movement longitudinally of the axis of the tube and rotatably about the said axis to produce a fine helical cut in the tube.

6. A machine of the class described having, in combination, means for supporting a tube, a guide cooperating with the supporting means to support the tube, a cutter, means for supporting the cutter so as to cut the tube, and means for relatively moving the tube and the cutter with a combined relative movement longitudinally of the axis of the tube and rotatably about the said axis while the cutter is cutting the tube, whereby the tube is relatively rotated and at the same time relatively advanced through the guide past the cutter during the cutting action of the cutter upon the tube.

In testimony whereof, I have hereunto subscribed my name.

JAMES W. WELSH.